United States Patent [19]

Stewart et al.

[11] Patent Number: 5,789,699
[45] Date of Patent: Aug. 4, 1998

[54] COMPOSITE PLY ARCHITECTURE FOR SABOTS

[75] Inventors: William Brian Stewart, Lancaster; Donald Richard Osment, East Petersburg, both of Pa.

[73] Assignee: Primex Technologies, Inc., Red Lion, Pa.

[21] Appl. No.: 767,560

[22] Filed: Dec. 16, 1996

[51] Int. Cl.$^6$ ............................................. F42B 14/06
[52] U.S. Cl. ............................................. 102/521
[58] Field of Search ........................... 102/520–523

[56] References Cited

U.S. PATENT DOCUMENTS

| | | | |
|---|---|---|---|
| 1,412 | 2/1839 | Kline et al. | 102/521 |
| 3,791,303 | 2/1974 | Sweeney et al. | 102/92.7 |
| 3,842,741 | 10/1974 | Brothers et al. | 102/69 |
| 3,911,824 | 10/1975 | Barr et al. | 102/92.7 |
| 4,164,904 | 8/1979 | Laviolette | 102/92.7 |
| 4,360,954 | 11/1982 | Burns et al. | 29/1.23 |
| 4,603,636 | 8/1986 | Wallow | 102/521 |
| 4,607,515 | 8/1986 | Goodfellow | 72/358 |
| 4,612,860 | 9/1986 | Flatau | 102/518 |
| 4,651,649 | 3/1987 | Nussbaum | 102/521 |
| 4,702,172 | 10/1987 | Wallow et al. | 102/521 |
| 4,706,569 | 11/1987 | Wallow et al. | 102/518 |
| 4,735,148 | 4/1988 | Holtzman et al. | 102/522 |
| 4,747,191 | 5/1988 | Montier et al. | 29/1.23 |
| 4,791,850 | 12/1988 | Minovitch | 89/8 |
| 4,823,703 | 4/1989 | Donaldson | 102/521 |
| 4,860,661 | 8/1989 | Bock et al. | 102/523 |
| 4,867,067 | 9/1989 | Becker et al. | 102/521 |
| 4,953,466 | 9/1990 | von Gerlach | 102/521 |
| 4,958,571 | 9/1990 | Puckett | 102/522 |
| 4,970,960 | 11/1990 | Feldmann | 102/506 |
| 5,063,854 | 11/1991 | Bisping et al. | 102/520 |
| 5,063,855 | 11/1991 | Diel et al. | 102/521 |
| 5,103,735 | 4/1992 | Kaste et al. | 102/521 |
| 5,105,713 | 4/1992 | Wirgau | 89/8 |
| 5,129,305 | 7/1992 | Reilly | 89/1.11 |
| 5,158,509 | 10/1992 | Ebaugh et al. | 244/3.24 |
| 5,352,537 | 10/1994 | Das et al. | 428/549 |
| 5,355,599 | 10/1994 | Thiesen et al. | 102/431 |
| 5,359,938 | 11/1994 | Campoli et al. | 102/521 |
| 5,417,139 | 5/1995 | Boggs et al. | 89/1.11 |
| 5,440,993 | 8/1995 | Osofsky | 102/374 |
| 5,473,989 | 12/1995 | Buc | 102/521 |
| 5,501,155 | 3/1996 | Hollis et al. | 102/521 |
| 5,635,660 | 6/1997 | McGovern | 86/21 |

FOREIGN PATENT DOCUMENTS

| 2251676 | 7/1992 | United Kingdom | 102/521 |
|---|---|---|---|

*Primary Examiner*—Harold J. Tudor
*Attorney, Agent, or Firm*—Todd E. Garabedian; Wiggin & Dana

[57] ABSTRACT

The invention is directed to a sabot having a longitudinal axis and comprising a plurality of sabot segments. Each of the sabot segments comprises a repeating structure of:

(a) a plurality of plies of a first fibrous material oriented radially from the longitudinal axis, wherein each fiber of the first fibrous material is oriented substantially parallel to the longitudinal axis; and (b) a plurality of plies of a second fibrous material, wherein each fiber of the second fibrous material is oriented nonparallel to the longitudinal axis and substantially parallel to every other fiber of the second fibrous material. The total number of plies in each repeating structure is at least five (5). The invention is also directed to an APFSDS kinetic energy tank projectile that utilizes the above-described sabot.

28 Claims, 4 Drawing Sheets

(0, 0, +, -, 0, 0,)

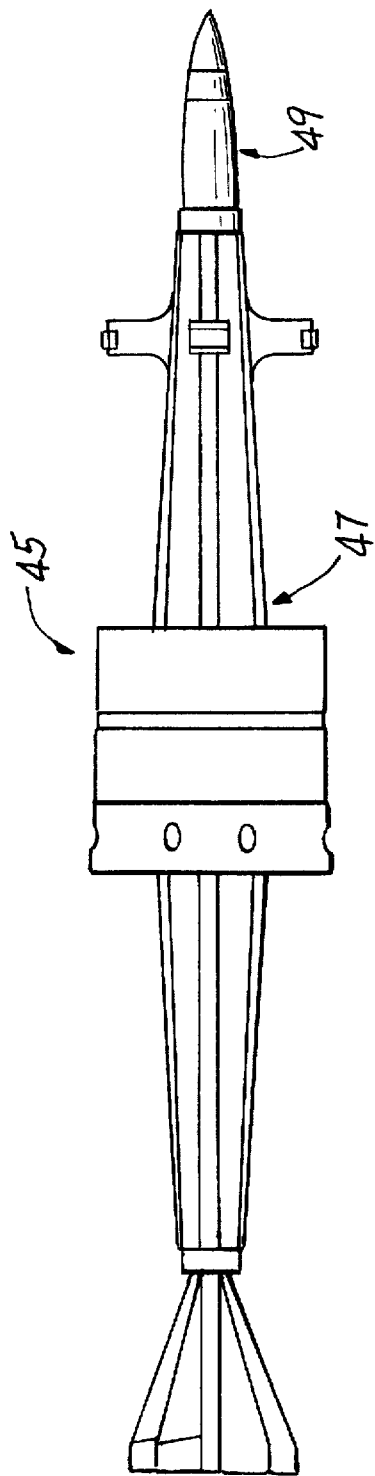
FIG-4
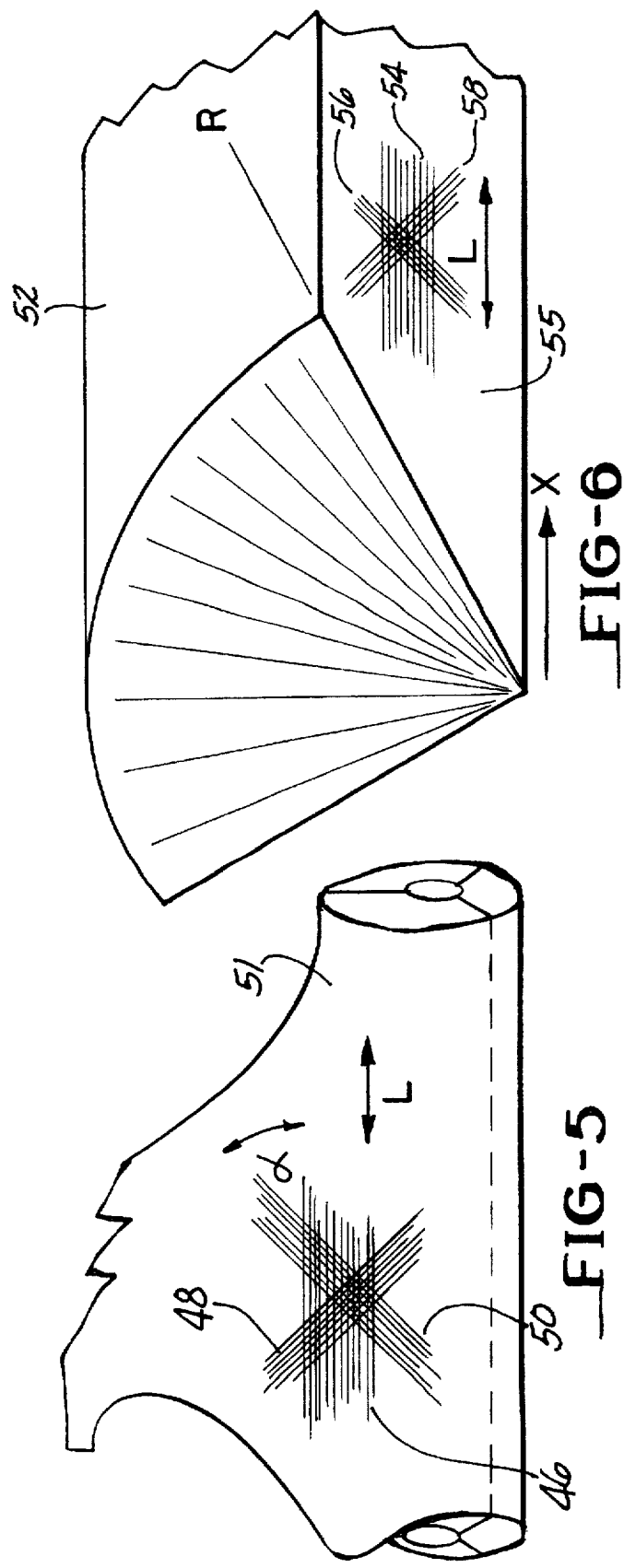
FIG-6
FIG-5

COMPOSITE PLY ARCHITECTURE FOR SABOTS

BACKGROUND OF THE INVENTION

1. Field of the Invention

The present invention relates to sabots for kinetic energy tank ammunition which are made from composite materials, and more particularly to sabots made from arrangements of multi-ply structures of materials that exhibit increased velocities.

2. Description of the Related Art

The projectile assembly used in currently available armor piercing fin stabilized discarding sabot (APFSDS) kinetic energy tank ammunition includes a long rod shaped penetrator encased by a sabot. The penetrator has a pointed front tip and a fin assembly attached to the rear of the penetrator. The sabot assembly typically includes three sabot segments spaced 120° from each other, each sabot segment having a front bourrelet portion, a rearwardly tapered central portion, an aft bourrelet, and a tapered rear portion. Each sabot segment has two flat radial faces which extend axially from front to rear. The segments are joined with faces abutting one another around the penetrator to form the full bore sabot.

Current advanced composite sabots for APFSDS kinetic energy tank ammunition are fabricated from unidirectional carbon fiber/epoxy resin prepreg materials in a multi-step process. The final structure is generally a thick-walled composite laminate consisting of multiple, stepped layers of material. This basic laminate consists of four plies of carbon fiber oriented with respect to the axial direction according to (0°, +45°, −45°, 0°) as shown in FIG. 1 at 10. This laminate consists of a first set of plies 12 oriented parallel to the longitudinal axis L, a second set of plies 14 oriented at +45° to the longitudinal axis, a third set of plies 16 oriented at −45° to the longitudinal axis, and a fourth set of plies 18 oriented parallel to the longitudinal axis. Thus, the basic structure has 50% of the fibers oriented in the axial direction and 50% of the fibers oriented in a 45° cross-plied direction. The axially oriented fibers provide axial strength and stiffness, and the cross-plies provide shear strength in the bulkhead (gun bore riding and obturation area) and buttress groove area (the area which transmits the gun firing pressure and acceleration loads from the sabot to the penetrator).

A sabot is used during firing and is located between the penetrator and the inner wall of the gun barrel. The resinous material of the sabot functions to reduce wear on the gun barrel and provide a seal that allows transfer of propellant pressure into firing acceleration to propel the penetrator out of the gun barrel. During flight, the sabot is discarded, and the penetrator travels to the target. Sabots having reduced mass are desirable in order to increase the velocity and accuracy of the penetrator during its travel to the target, and to increase the penetrating power of the penetrator. However, prior attempts to reduce the mass of the sabot by reducing the thickness of the laminate have generally proven unsatisfactory. Reduction of laminate thickness reduces the axial and shear strength of the sabot and may cause leakage of pressurized gas generated during firing and reduction of generated velocity, or ultimate destruction of the sabot and projectile.

Numerous attempts have been made at producing a lightweight sabot with increased strength and stiffness. U.S. Pat. No. 4,735,148 to Holtzman et al. discloses a unitary lightweight sabot formed from polypropylene, such as "DYPRO" type 8810Z (Atlantic Richfield Co.) or other moldable plastic resin. Holtzman et al. teach that fiber composite materials are not preferred due to their detrimental effect on uniform disintegration.

U.S. Pat. No. 5,352,537 to Das et al. discloses a metal matrix composite produced by forming a solidified aluminum base alloy into a powder. The powder is plasma sprayed onto at least one substrate having a fiber reinforcing material to form preforms which are useful as sabot casings.

U.S. Pat. No. 4,702,172 to Wallow et al. discloses a sabot arrangement made from non-modified epoxy resin, polyester-modified polyamide 6, glass fortified nylon, carbon fiber-reinforced thermoplastic composites, or elastomer-modified polyamide 6.

U.S. Pat. No. 5,359,938 to Campoli et al. discloses an ultra lightweight sabot for a subcaliber projectile made from a polymer composite or aluminum.

U.S. Pat. No. 5,063,855 to Diel et al. discloses a discardable propelling cage sabot provided with a common form locking zone for transmission of acceleration forces. The materials used in the sabots include metals, plastic, or materials reinforced with carbon fibers or glass fibers.

U.S. Pat. No. 5,063,854 to Bisping et al. discloses a propelling cage discarding sabot that is made from a polyamide and about 5% to about 30% by weight carbon fiber. The carbon or glass fibers are aligned parallel to the longitudinal axis of the sabot.

U.S. Pat. No. 4,958,571 to Puckett discloses a sabot for an APFSDS penetrator formed of continuous filaments that are sufficiently long to be wrapped from the rearward obturator to the forward obturator.

Thus, there is a need in the art for a lower mass sabot that maintains high axial and shear strength and stiffness. The present invention is believed to be an answer to that need.

SUMMARY OF THE INVENTION

Accordingly, one aspect of the present invention is directed to a sabot having a longitudinal axis and comprising a plurality of sabot segments. Each of the sabot segments comprises a repeating structure of:

(a) a plurality of plies of a first fibrous material oriented radially from the longitudinal axis, wherein each fiber of the first fibrous material is oriented substantially parallel to the longitudinal axis; and (b) a plurality of plies of a second fibrous material, wherein each fiber of the second fibrous material is oriented nonparallel to the longitudinal axis and substantially parallel to every other fiber of the second fibrous material. A ply of the first fibrous material is oriented adjacent to one of the plies of the second fibrous material, and the total number of plies in each repeating structure is at least five (5).

The invention is also directed to an APFSDS kinetic energy tank projectile, comprising a penetrator having a longitudinal axis and a sabot comprising a plurality of sabot segments oriented concentrically around the penetrator. Each sabot segment comprises a repeating structure of:

(a) a plurality of plies of a first fibrous material oriented radially from the longitudinal axis, wherein each fiber of the first fibrous material is oriented substantially parallel to the longitudinal axis; and (b) a plurality of plies of a second fibrous material, wherein each fiber of the second fibrous material is oriented nonparallel to the longitudinal axis and substantially parallel to every other fiber of the second fibrous material. Each of the plies of the first fibrous material is oriented adjacent to each of the plies of the second fibrous material, and the total number of plies in each repeating structure is at least five (5).

BRIEF DESCRIPTION OF THE DRAWINGS

The present invention will be more fully understood from the following detailed description taken in conjunction with the accompanying drawings, in which:

FIG. 4 is a side view of an APFSDS projectile that includes a sabot made using the composite ply architecture of the present invention;

FIG. 5 is an enlarged side view of a section of a sabot segment showing the composite ply architecture of the invention; and FIG. 6 is cross-sectional view of a sabot segment made using the composite ply architecture of the present invention.

DETAILED DESCRIPTION OF THE PREFERRED EMBODIMENTS

The present invention is directed to arrangements of multi-ply structures for composite sabots for tank ammunition known as armor piercing fin stabilized discarding sabot (APFSDS) projectiles. APFSDS projectiles that utilize sabots made using the arrangement of multi-ply structures exhibit increased structural strength, stiffness, and durability during firing. Since the arrangement of multi-ply structures of the present invention displays a high level structural strength and stiffness, less material is required to manufacture the sabots to required government specifications. The lower material requirement results in a sabot that has less mass (i.e., lower weight) than previous sabots of similar configuration. Significantly, the lower material requirement results in greater velocities for the projectile as it exits the gun barrel due to conservation of energy. That is, the propelling force generated by the gun is used to increase the velocity of the projectile due to the reduced mass of the sabot.

Figure 1:
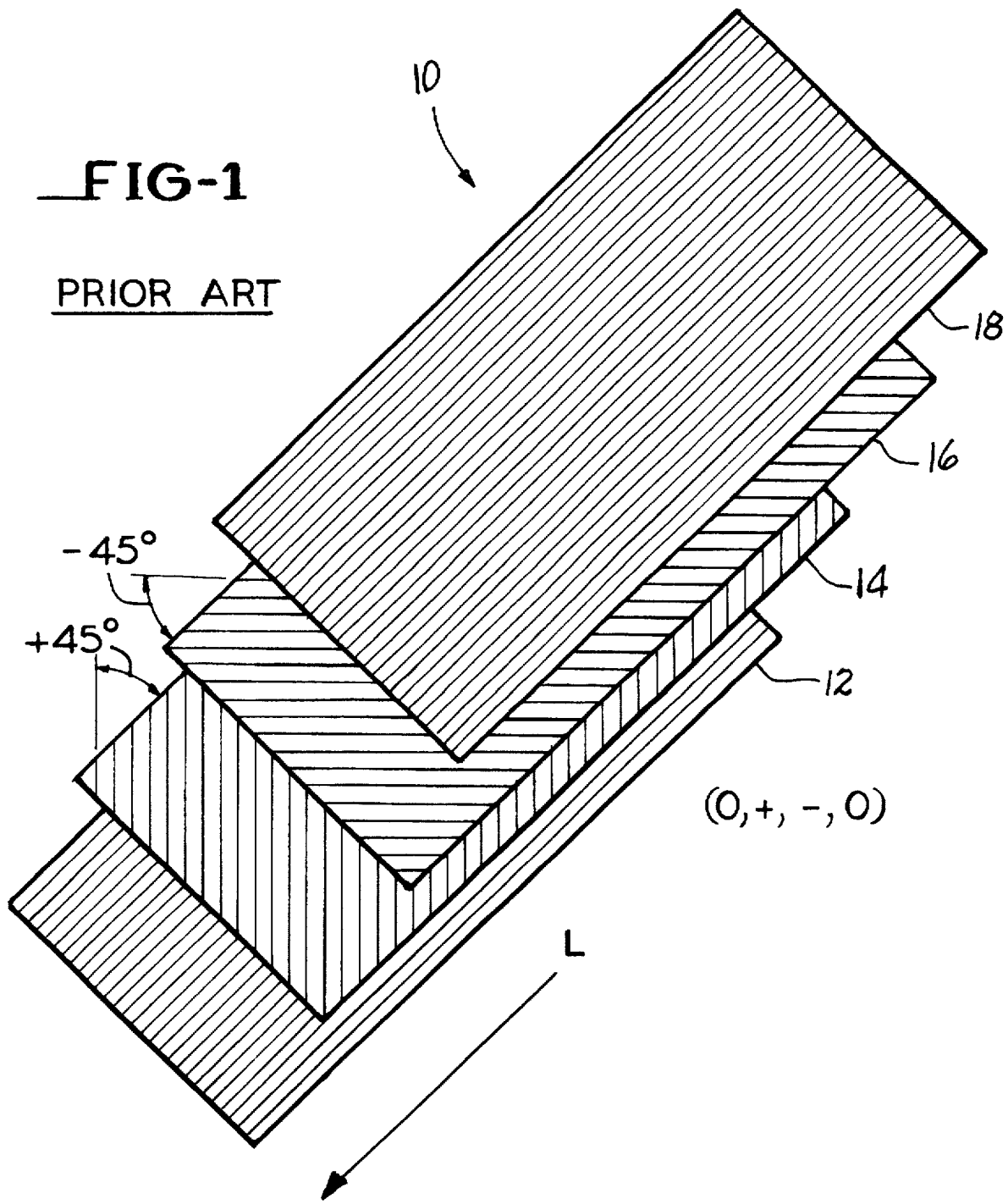
FIG. 1 is a exploded diagram of the composite ply architecture of the prior art.
Figure 2:
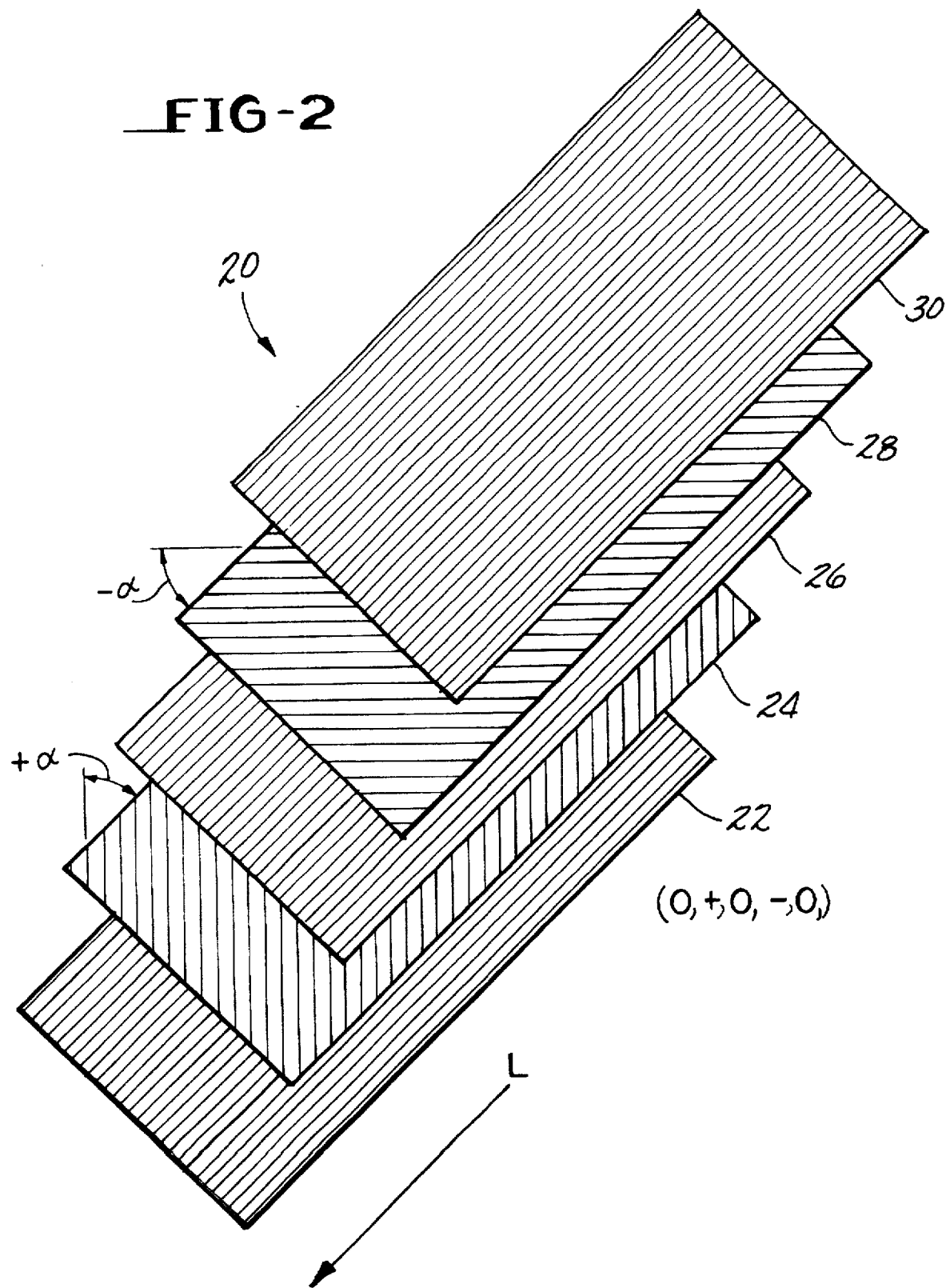
FIG. 2 is a exploded diagram of an illustrative embodiment of the composite ply architecture of the present invention.

FIG. 2 illustrates one embodiment of the invention 20 in which five plies of fibrous material are arranged as (0,+,0,−,0) in which 60% of the plies are arranged so that each fiber in the ply is parallel with the longitudinal axis L of the sabot, and 40% of the plies are arranged so that each fiber in the ply is nonparallel with the longitudinal axis L. As defined herein, zero ("0") represents plies with fibers oriented parallel to the longitudinal axis L; "+" represents plies that are oriented at angle +α to the longitudinal axis; "−" represents plies oriented at angle −α to the longitudinal axis. Further, as defined herein, the term "fibrous material" refers to reinforcement fibers impregnated with a resin matrix. The illustrative embodiment shown in FIG. 2 consists of (from bottom to top) a first ply 22 with fibers oriented parallel to the longitudinal axis L; a second ply 24 with fibers oriented at an angle +α to the longitudinal axis L, a third ply 26 with fibers oriented parallel to the longitudinal axis L, a fourth ply 28 with fibers oriented at an angle −α to the longitudinal axis L, and a fifth ply 30 with fibers oriented parallel to the longitudinal axis L. The second and fourth plies 24 and 28 are arranged in a cross-ply format and the fibers of each ply may be oriented at any angle from the longitudinal axis L. Exemplary angles for α include ±20°, ±30°, ±45° or any other angle that is not parallel with the longitudinal axis L. Other angle combinations include, but are not limited to, (0,+32,0,−32,0), (0,+27,0,−27,0), (0,+15,0,−15,0), and the like. In addition, it is not necessary to employ equal and opposite combinations of fiber arrangements, such as ±45°. Combinations of nonparallel fibers, such as −30° and +45°, or −60° and +30° may also be implemented as required for specific load requirements. Such combination of nonparallel fibers may be derived by the ordinary skilled artisan using design analysis conventional in the art.

The ply arrangement shown in FIG. 2 allows construction of a sabot segment having higher strength and stiffness than the conventional biased (0, +45, −45, 0) arrangements. The higher strength and stiffness of the ply arrangement of the present invention as represented in FIG. 2 permits the mass of the sabot to be reduced by approximately 17% compared to conventional (0,+45,−45,0) arrangements, while maintaining the strength and stiffness necessary to produce a sabot that performs according to government specifications.

Figure 3:
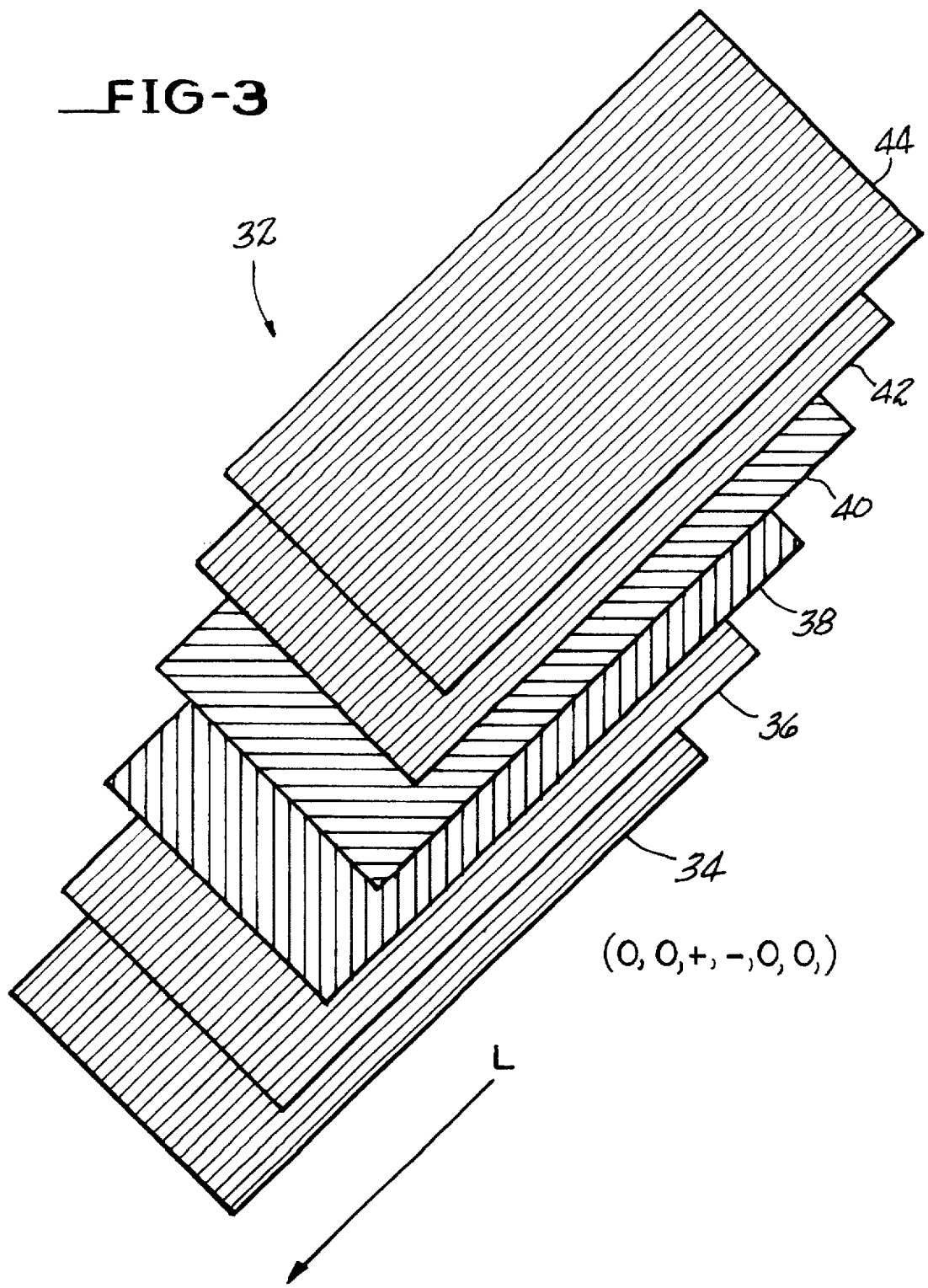
FIG. 3 is a exploded diagram of another illustrative embodiment of the composite ply architecture of the present invention.

FIG. 3 illustrates another embodiment of the invention 32 in which six plies are arranged as (0,0,+,−,0,0) in which 67% of the plies are oriented with their fibers parallel with the longitudinal axis L of the sabot, and 33% of the plies are oriented with their fibers nonparallel with the longitudinal axis L.

As shown in FIG. 3, two plies 34 and 36 are arranged with their fibers parallel to the longitudinal axis L. Two cross plies 38 and 40 are arranged adjacent to the longitudinal plies 34 and 36. One ply 38 is arranged so that the fibers in the ply 38 are at an angle +α, and the other ply 40 is oriented so that the fibers in the play 40 are at −α. These cross plies are adjacent to two longitudinal plies 42 and 44.

As in FIG. 2, the angle α may be any angle that is nonparallel to the longitudinal axis, such as ±30°, ±45°, and the like. In one embodiment, the angle α is ±45°. Other angle combinations include, but are not limited to, (0,0,+32,−32,0,0), (0,0,+27,−27,0,0), (0,0,+15,−15,0,0), and the like. This arrangement of plies also exhibits increased structural strength and stiffness and permits sabots to be manufactured using less material resulting in a sabot having less mass. The ply architecture shown in FIG. 3 displays 20% less mass compared to (0,+45,−45,0).

The arrangement of plies shown in FIGS. 2 and 3 represent one unit of the sabot segment that is repeated many times to obtain a structural sabot segment having increased strength and stiffness. Thus, the unit (0,+,0,−,0) may be repeated to achieve a structural sabot segment of (0,+,0,−,0; 0,+,0,−,0 . . . ). Similarly, the six-ply arrangement can be repeated thus (0,0,+,−,0,0; 0,0,+,−,0,0; 0,0,+,−,0,0, . . . ). Further, symmetric repeating structures may be fabricated using a symmetric arrangement of plies. For example, a ten-ply repeating unit may be made using a symmetric arrangement of two five-ply structures: (0,+,0,−0,0,−,0,+,0). Similarly, a twelve-ply repeating unit may be made from a symmetric arrangement of two six-ply structures: (0,0,+,−, 0,0,0,0,−,+,0,0).

FIG. 4 shows an APFSDS projectile 45 that includes a complete sabot assembly 47 manufactured using the composite ply architecture of the present invention and assembled on a penetrator projectile assembly 49. FIG. 5 shows a sabot assembled from sabot segments. As shown in FIG. 5, an exemplary sabot segment 51 includes the arrangement of plies of the composite ply architecture with respect to the sabot segment. One set of plies 46 are arranged so that the fibers are parallel to the longitudinal axis L. A first cross-ply 48 is oriented so that the fibers are at an angle +α with respect to the longitudinal axis L. Another cross-ply 50 is oriented so that the fibers are at an angle −α with respect to the longitudinal axis L. The arrangement of plies may be any of the ply arrangements discussed hereinbefore, such as (0,+,0,−,0), (0,0,+,−,0,0) or the symmetric structures (0,+,0,−,0,0,−,0,+,0) or (0,0,+,−,0,0,0,0,−,+,0,0).

FIG. 6 shows a cross-sectional view of a portion of a sabot segment made using the ply architecture of the present invention. The sabot segment 52 is made from plies of fibrous material that are arranged as discussed above. A first ply 54 is arranged radially in the RX plane 55 so that each fiber of the fibrous material is parallel to the longitudinal axis L of the sabot. The next ply of fibrous material 56 is arranged adjacent to the first ply 54. Each fiber of this ply is nonparallel to the longitudinal axis L, for example, +45°. The next ply of fibrous material 58 is arranged adjacent to the second ply 56. Each fiber of this ply is nonparallel to the longitudinal axis L, for example, −45°. These nonparallel plies are laminated to the first ply in the RX plane and add shear strength to the sabot segment in the bulkhead and buttress groove areas. Additional ply layers are subsequently added to the RX plane according to one of the above-described ply arrangements to manufacture the entire sabot segment.

The plies of the sabot segment may be assembled using any method known in the art, such as manual lay-ups, or robotic procedures. One useful method of manufacturing sabots having the composite ply architecture of the present invention is disclosed in U.S. Pat. No. 5,635,660 which is herein incorporated by reference in its entirety. Briefly, the method entails using an apparatus comprising a base with an elongated substantially semi-circular arcuate channel, a hinged wing assembly including an elongated hinge pin pivotally connecting a pair of planar substantially rectangular wing members, hinge pin support means for rigidly fixing the hinge pin coaxially in the arcuate channel, compression means for urging the wing members pivotally around the hinge pin in a direction toward one another in the arcuate channel to compress the sabot segment to a predetermined angular section of the channel, and heating means for heating the sabot segment in the channel.

Use of this apparatus permits manufacture of arcuate sabot segments by laminating together wedge-shaped sections. The method entails arranging a plurality of plies of a carbon fiber material to form wedge-shaped sections having a narrow edge and an opposed wide edge, stacking the wedge-shaped sections contiguously in the arcuate channel with the wider edges adjacent the inner circumference of the channel, positioning the hinged wing assembly so that the hinge pin is coaxial with the arcuate channel and the wing members about the uppermost stacked wedge-shaped members, supporting the hinge pin at opposing sides of the arcuate channel, applying an urging force to the wing members with the compression means, urging the wing members to pivot about the hinge pin and compress the stacked wedge-shaped sections with a predetermined pressure, applying heat to the compressed stack at a predetermined temperature, and maintaining the predetermined temperature and pressure for a predetermined period of time. If desired, after the composite ply architecture is manufactured, it can be shaped to any desired sabot shape using known processing techniques.

Materials useful for manufacturing sabots having the composite architecture of the present invention include combinations of various reinforcements, such as fibers embedded in a resin matrix. Exemplary fibers include carbon fibers, such as such as AS-4 and IM-7 available from Hercules, fiberglass, aramid fibers, such as "KEVLAR" or other fibers known in the reinforcement art. The fibers are preferably embedded in a resin matrix, such as thermoset or epoxy matrices. Alternatively, the product "ULTEM" (thermoplastic resin polyether imide available from General Electric, Inc.) may be utilized. The carbon fiber materials or the resin matrix materials may be utilized either alone or in combination. The selected reinforcement fibers may be combined with the selected matrix to form a prepreg (i.e., a preimpregnated fibers), which are formed into the desired sabot shape. In the alternative, the reinforcement fibers may be dry-stiched into a preform and subsequently impregnated with matrix. A particularly useful combination of materials is a prepreg made from IM-7 and "ULTEM" to form a carbon fiber/thermoplastic reinforced material. When manufactured in a (0,+,0,−,0) architecture, this combination of materials in this architectural ply format displays a 22% weight reduction over a (0,+,−,0) structure using the same materials.

A surprising advantage of the composite ply architectures of the present invention is that the repeating ply arrangements provide performance improvements in the final sabot while not requiring modifications to the current government-approved fabrication process. Additionally, production costs for producing sabots having the ply architecture of the present inventions is kept to a minimum.

While the invention has been described in combination with embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims. All patent applications, patents, and other publications cited herein are incorporated by reference in their entirety.

What is claimed is:

1. A sabot having a longitudinal axis and comprising a plurality of sabot segments, each of said sabot segments comprising a repeating structure of:

(a) a plurality of plies of a first fibrous material oriented radially from said longitudinal axis, wherein each fiber of said first fibrous material is oriented substantially parallel (0) to said longitudinal axis; and (b) a plurality of plies of a second fibrous material, comprising a first portion of said plurality of plies of said second fibrous material having each fiber oriented at a positive acute angle (+) with respect to said longitudinal axis and substantially parallel to every other fiber of said first portion; and a second portion of said plurality of plies of said second fibrous material having each fiber oriented at a negative acute angle (−) with respect to said longitudinal axis and substantially parallel to every other fiber of said second portion, said repeating structure being (0,+,0,−,0).

2. The sabot of claim 1, wherein said first fibrous material includes reinforcement fibers selected from the group consisting of fiberglass, carbon fiber, aramid fibers, and combinations thereof, and a resin-material selected from the group consisting of epoxy resin, polyether imide thermoplastic resin, and combinations thereof.

3. The sabot of claim 1, wherein said second fibrous material includes reinforcement fibers selected from the group consisting of fiberglass, carbon fiber, aramid fibers, and combinations thereof, and a resin material selected from the group consisting of epoxy resin, polyether imide thermoplastic resin, and combinations thereof.

4. The sabot of claim 1, wherein said positive acute angle is +30 degrees.

5. The sabot of claim 1, wherein said negative acute angle is −30 degrees.

6. The sabot of claim 1, wherein said positive acute angle is +45 degrees.

7. The sabot of claim 1, wherein said negative acute angle is −45 degrees.

8. A sabot having a longitudinal axis and comprising a plurality of sabot segments, each of said sabot segments comprising a repeating structure of:
 (a) a plurality of plies of a first fibrous material oriented radially from said longitudinal axis, wherein each fiber of said first fibrous material is oriented substantially parallel (0) to said longitudinal axis; and
 (b) a plurality of plies of a second fibrous material, comprising
  a first portion of said plurality of plies of said second fibrous material having each fiber oriented at a positive acute angle (+) with respect to said longitudinal axis and substantially parallel to every other fiber of said first portion; and
  a second portion of said plurality of plies of said second fibrous material having each fiber oriented at a negative acute angle (−) with respect to said longitudinal axis and substantially parallel to every other fiber of said second portion, said repeating structure being (0,0,+,−,0,0).

9. The sabot of claim 8, wherein said first fibrous material includes reinforcement fibers selected from the group consisting of fiberglass, carbon fiber, aramid fibers, and combinations thereof, and a resin material selected from the group consisting of epoxy resin, polyether imide thermoplastic resin, and combinations thereof.

10. The sabot of claim 8, wherein said second fibrous material includes reinforcement fibers selected from the group consisting of fiberglass, carbon fiber, aramid fibers, and combinations thereof, and a resin material selected from the group consisting of epoxy resin, polyether imide thermoplastic resin, and combinations thereof.

11. The sabot of claim 8, wherein said positive acute angle is +30 degrees.

12. The sabot of claim 8, wherein said negative acute angle is −30 degrees.

13. The sabot of claim 8, wherein said positive acute angle is +45 degrees.

14. The sabot of claim 8, wherein said negative acute angle is −45 degrees.

15. An APFSDS kinetic energy tank projectile, comprising:
 a penetrator having a longitudinal axis; and
 a sabot comprising a plurality of sabot segments oriented concentrically around said penetrator and comprising a repeating structure of:
 (a) a plurality of plies of a first fibrous material oriented radially from said longitudinal axis, wherein each fiber of said first fibrous material is oriented substantially parallel (0) to said longitudinal axis; and
 (b) a plurality of plies of a second fibrous material, comprising
  a first portion of said plurality of plies of said second fibrous material having each fiber oriented at a positive acute angle (+) with respect to said longitudinal axis and substantially parallel to every other fiber of said first portion; and
  a second portion of said plurality of plies of said second fibrous material having each fiber oriented at a negative acute angle (−) with respect to said longitudinal axis and substantially parallel to every other fiber of said second portion, said repeating structure being (0,+,0,−,0).

16. The APFSDS projectile of claim 15, wherein said first fibrous material includes reinforcement fibers selected from the group consisting of fiberglass, carbon fiber, aramid fibers, and combinations thereof, and a resin material selected from the group consisting of epoxy resin, polyether imide thermoplastic resin, and combinations thereof.

17. The APFSDS projectile of claim 15, wherein said second fibrous material includes reinforcement fibers selected from the group consisting of fiberglass, carbon fiber, aramid fibers, and combinations thereof, and a resin material selected from the group consisting of epoxy resin, polyether imide thermoplastic resin, and combinations thereof.

18. The APFSDS projectile of claim 15, wherein said positive acute angle is +30 degrees.

19. The APFSDS projectile of claim 15, wherein said negative acute angle is −30 degrees.

20. The APFSDS projectile of claim 15, wherein said positive acute angle is +45 degrees.

21. The APFSDS projectile of claim 15, wherein said negative acute angle is −45 degrees.

22. An APFSDS kinetic energy tank projectile, comprising:
 a penetrator having a longitudinal axis; and
 a sabot comprising a plurality of sabot segments oriented concentrically around said penetrator and comprising a repeating structure of:
 (a) a plurality of plies of a first fibrous material oriented radially from said longitudinal axis, wherein each fiber of said first fibrous material is oriented substantially parallel (0) to said longitudinal axis; and
 (b) a plurality of plies of a second fibrous material, comprising
  a first portion of said plurality of plies of said second fibrous material having each fiber oriented at a positive acute angle (+) with respect to said longitudinal axis and substantially parallel to every other fiber of said first portion; and
  a second portion of said plurality of plies of said second fibrous material having each fiber oriented at a negative acute angle (−) with respect to said longitudinal axis and substantially parallel to every other fiber of said second portion, said repeating structure being (0,0,+,−,0,0).

23. The APFSDS kinetic energy tank projectile of claim 22, wherein said first fibrous material includes reinforcement fibers selected from the group consisting of fiberglass, carbon fiber, aramid fibers, and combinations thereof, and a resin material selected from the group consisting of epoxy resin, polyether imide thermoplastic resin, and combinations thereof.

24. The APFSDS kinetic energy tank projectile of claim 22, wherein said second fibrous material includes reinforcement fibers selected from the group consisting of fiberglass, carbon fiber, aramid fibers, and combinations thereof, and a resin material selected from the group consisting of epoxy resin, "ULTEM", and combinations thereof.

25. The APFSDS projectile of claim 22, wherein said positive acute angle is +30 degrees.

26. The APFSDS projectile of claim 22, wherein said negative acute angle is −30 degrees.

27. The APFSDS projectile of claim 22, wherein said positive acute angle is +45 degrees.

28. The APFSDS projectile of claim 22, wherein said negative acute angle is −45 degrees.

* * * * *